United States Patent
Zhang et al.

(10) Patent No.: US 8,598,510 B2
(45) Date of Patent: Dec. 3, 2013

(54) SOURCE COMPENSATED FORMATION DENSITY MEASUREMENT METHOD BY USING A PULSED NEUTRON GENERATOR

(75) Inventors: Qianmei Zhang, Katy, TX (US); Constantyn Chalitsios, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 421 days.

(21) Appl. No.: 12/796,957

(22) Filed: Jun. 9, 2010

(65) Prior Publication Data
US 2010/0314535 A1    Dec. 16, 2010

Related U.S. Application Data

(60) Provisional application No. 61/185,725, filed on Jun. 10, 2009.

(51) Int. Cl.
*G01V 5/04*    (2006.01)
(52) U.S. Cl.
USPC ......................................................... 250/261
(58) Field of Classification Search
USPC .................... 250/253–266, 370.01
See application file for complete search history.

(56) References Cited

U.S. PATENT DOCUMENTS

| 5,068,532 A * | 11/1991 | Wormald et al. .......... 250/269.2 |
| 2002/0046836 A1 | 4/2002 | Pereira et al. |
| 2002/0170348 A1 * | 11/2002 | Roscoe et al. ............. 73/152.02 |
| 2005/0067160 A1 | 3/2005 | Jacobson |

FOREIGN PATENT DOCUMENTS

WO    2008070103 A2    6/2008

OTHER PUBLICATIONS

W.A. Gilchrist Jr., et al., Introduction of a New Through-Tubing Multifunction Pulsed Neutron Instrument; Society of Petroleum Engineers; SPE Annual Technical Conference and Exhibition, Oct. 3-6, 1999; SPE Paper No. 56803-MS.
Richard C. Odom et al., "Improvements in a Through-Casing Pulsed-Neutron Density Log," Society of Petroleum Engineers, SPE Annual Technical Conference and Exhibition; Sep. 30-Oct. 2, 2001; SPE Paper No. 71742-MS.
Notification of Transmittal of the International Search Report and the Written Opinion of the International Searching Authority, or the Declaration; PCT/US2010/037977; Feb. 7, 2011.

\* cited by examiner

*Primary Examiner* — Michael G Lee
*Assistant Examiner* — Matthew Mikels
(74) *Attorney, Agent, or Firm* — Cantor Colburn LLP

(57) ABSTRACT

A downhole instrument for estimating density of sub-surface materials includes: a neutron source, a source monitoring detector, a near detector and a far detector. Each of the detectors may be coupled to an electronics unit adapted for receiving a detection signal from each of the detectors and compensating the detection signal for at least one of the near detector and the far detector according to the detection signal of the source monitoring detector. A method for estimating density is provided.

15 Claims, 11 Drawing Sheets

SOURCE COMPENSATED FORMATION DENSITY MEASUREMENT METHOD BY USING A PULSED NEUTRON GENERATOR

CROSS-REFERENCE TO RELATED APPLICATIONS AND PRIORITY CLAIM

This application claims the benefit of U.S. Provisional Application Ser. No. 61/185,725, entitled "SOURCE COMPENSATED FORMATION DENSITY MEASUREMENT METHOD BY USING A PULSED NEUTRON GENERATOR", filed Jun. 10, 2009, under 35 U.S.C. §119(e), which is incorporated herein by reference in its entirety.

BACKGROUND OF THE INVENTION

1. Field of the Invention

The invention disclosed herein relates to exploration for oil and gas and, in particular, to applications involving a pulsed neutron generator.

2. Description of the Related Art

In the exploration for oil and gas, it is necessary to drill a borehole into the earth. While drilling of the borehole permits operators to evaluate sub-surface materials and to extract desired hydrocarbons, many problems are encountered.

For example, use of nuclear instrumentation presents significant safety issues for personnel. That is, workers tasked with performing well logging issues are often asked to handle radioactive sources that can cause detrimental health effects if great care is not taken. Further, the responsibility for complying with regulation governing the handling of sources of ionizing radiation can be a great burden.

One example of a hazardous instrument is that of a logging instrument that uses a cesium-137 (Cs-137) source. Typically, the Cs-137 source is of a considerable strength. Accordingly, the cost of maintaining the source, the safety issues, and the additional tooling required to support use of the Cs-137 source can make such implementations expensive.

Therefore, what are needed are methods and apparatus that provide for reduced health and safety issues and cost when performing well logging with nuclear instrumentation. Preferably, the methods and apparatus provide for reductions in source terms associated with such instrumentation.

BRIEF SUMMARY OF THE INVENTION

In one embodiment, the invention includes a downhole instrument for estimating density of sub-surface materials, the instrument including: a neutron source, a source monitoring detector, a near detector and a far detector, each of the detectors coupled to an electronics unit adapted for receiving a detection signal from each of the detectors and compensating the detection signal for at least one of the near detector and the far detector according to the detection signal of the source monitoring detector.

In another embodiment, the invention includes a method for estimating a density of sub-surface materials, that includes: irradiating the sub-surface materials with a neutron source; detecting gamma rays from the irradiating; detecting gamma rays returning from the sub-surface materials; compensating a signal representing the returning gamma rays according to a signal for the gamma rays from the irradiating; and estimating the density of the sub-surface materials according to the compensated signal.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are methods and apparatus for performing density ($\rho$) measurements and calculations for sub-surface materials. The techniques provided herein rely on, among other things, a "sourceless" instrument that includes a pulsed neutron generator which can be turned on/off at will. Advantageously, the techniques provide for elimination of a separate source of gamma photons traditionally included in a logging instrument, thereby reducing cost and enhancing radiological safety.

Other improvements resulting from elimination of the gamma source (also referred to in the art as a "chemical source") include elimination of shielding and radiation issues during source transportation and tool maintenance, and results in a more compact tool. The more compact and simplified tool also results in reduction of manufacture costs and simplification of maintenance requirements. In short, the teachings herein provide significant added value to a pulse neutron generator based tool deployed for other purposes.

Figure 1:
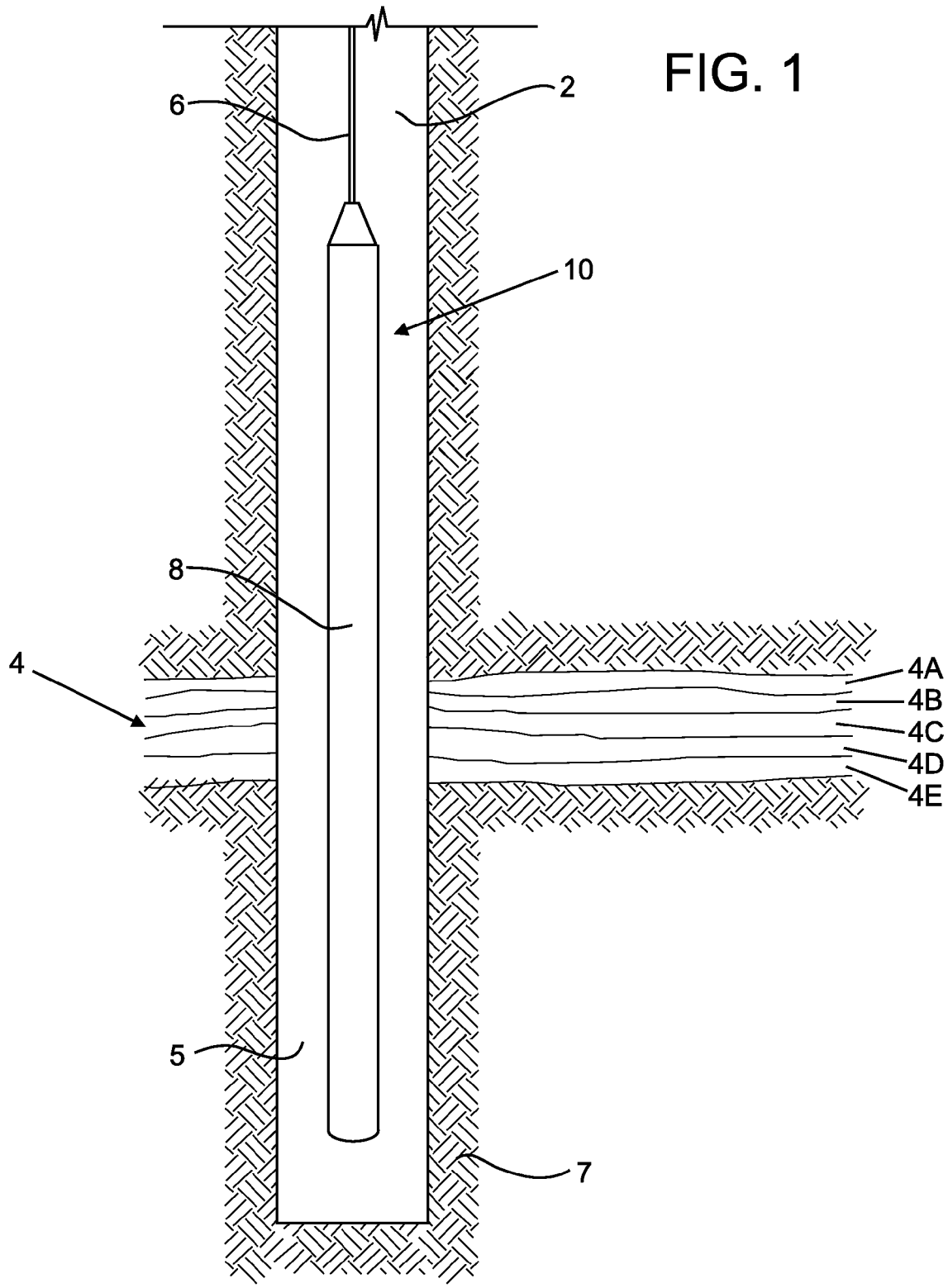
FIG. 1 illustrates an exemplary embodiment of a logging instrument in a borehole penetrating the earth.

Referring now to FIG. 1, an exemplary well logging instrument 10 (also referred to as a "tool") is shown disposed in a borehole 2 (also referred to as a "wellbore"). The borehole 2 is drilled through earth 7 and penetrates formations 4, which include various formation layers 4A-4E. In this example, the logging instrument 10 is lowered into and withdrawn from the borehole 2 after a drilling procedure, such as by use of an armored electrical cable 6 or similar conveyance as is known in the art. Various components may be included in the instrument 10. One example includes a neutron-based density measurement instrument 8 for performing measurements and analyses.

In typical embodiments, the borehole 2 includes materials such as would be found in oil exploration, including a mixture of liquids such as water, drilling fluid, mud, oil, gases, and formation fluids as may be indigenous to the surroundings. One skilled in the art will recognize that the various geologic features as may be encountered in a subsurface environment may be referred to as "formations," and that the array of materials down the borehole (i.e., downhole) may be referred to as "sub-surface materials." That is, the formations are formed of sub-surface materials. Accordingly, as used herein, it should be considered that while the term "formation" generally refers to geologic formations of interest, and "sub-surface material," includes any materials of interest such as fluids, gases, liquids, and the like, and may include other materials such as drilling mud. A layer of materials between an outer surface of the instrument 10 and a wall of the borehole 2 is referred to as a "standoff layer" 5, and includes a thickness of standoff.

The teachings herein provide for making accurate measurements of properties of the sub-surface materials. Before the logging instrument and techniques are discussed in detail, certain additional definitions are provided.

As used herein, the term "gamma radiation detector" relates to instruments that measure the gamma radiation entering the instrument. For example, the gamma radiation detector may use a scintillator material that interacts with gamma radiation and produces light photons which are in turn detected by a photomultiplier tube coupled to electronics. Exemplary gamma radiation detectors include, without limitation, sodium iodide (NaI), cesium iodide (CsI), bismuth germinate (BGO), thallium iodide (TlI), lanthanum bromide (LaBr3) and other organic crystals, inorganic crystals, plastics, solid state detectors, and combinations thereof.

Also as used herein, the terms "count rate," "counting rate," and the like make reference to a data signal from a radiation detector that is indicative of radiation (such as gamma rays) for a designated sampling area, volume, direction, period of time or other such parameter. Accordingly, it is considered that various forms of detection signals may be used to ascertain, qualify and quantify aspects of radiation discussed herein.

Also as used herein, the term "characterization data" generally makes reference to a radiological profile (e.g., a gamma emission profile) of the instrument. More specifically, the instrument will exhibit certain radiological characteristics. In various embodiments, these characteristics are a result of irradiation with neutrons, and activation of components of the instrument which may ultimately result in emission of gamma rays from the components. Non-limiting embodiments for the generation of characterization data are provided herein.

The term "detector geometry" relates to a configuration of the gamma radiation detector(s). The detector geometry may include a size and a shape of the scintillator material and photomultiplier or other type of detector. The term "placement geometry" relates to relative placement of a gamma radiation detector within the logging instrument or in relation to the surrounding volume. The term "logging while drilling" (LWD) relates to measuring parameters from the borehole 2 while drilling is taking place. The term "sonde" relates to a section of the well logging tool that contains measurement sensors as opposed to the section that contains electronics and power supplies.

The terms "neutron capture" or "capture" make reference to a kind of nuclear interaction in which a neutron collides with an atomic nucleus and is merged into the nucleus, thus forming a heavier nucleus. As a result, the heavier nucleus enters into a higher energy state. At least some of the energy of the neutron capture interaction is usually lost by emission of gamma rays.

The terms "inelastic collision," "neutron inelastic scattering" or "inelastic" make reference to a collision in which an incoming neutron interacts with a target nucleus and causes the nucleus to become excited, thereby releasing a gamma ray before returning to the ground state. In inelastic collisions, the incoming neutron is not merged into the target nucleus, but transfers some of its energy to the target nucleus before that energy is released in the form of a gamma ray.

Various types of interactions involve either absorption or emission of gamma radiation. Predominant types (as a function of increasing energy) include photoelectric effect, Compton scattering and pair production. As a matter of convention, "photoelectric effect" relates to interactions where electrons are emitted from matter after the absorption of a gamma ray. The emitted electrons may be referred to as "photoelectrons." The photoelectric effect may occur with photons having energy of about a few eV or higher. If a photon has sufficiently high energy, Compton scattering or pair production may occur. Generally, Compton scattering relates to a decrease in energy (increase in wavelength) of a gamma ray photon when the photon interacts with matter. In pair production, higher energy photons may interact with a target and cause an electron and a positron pair to be formed.

Further, it should be noted that a variety of neutron emitting sources are known. Examples include americium-beryllium (AmBe) sources, plutonium-beryllium (PuBe) sources, californium sources (e.g., Cf-252) and others. Therefore, while the teachings herein are generally directed to a pulsed neutron source, it should be recognized that the term "neutron emitting," "neutron generator," and the like may be considered with reference to the variety of sources now available or subsequently devised for providing neutrons downhole.

Density tools use gamma ray radiation to determine the density of the formation, which in turn leads to determination of the lithology and porosity of the well environment. Typical density tools utilize a Cs-137 radioactive source to generate gamma rays. One example is provided in FIG. 2, and discussed below.

Figure 2:
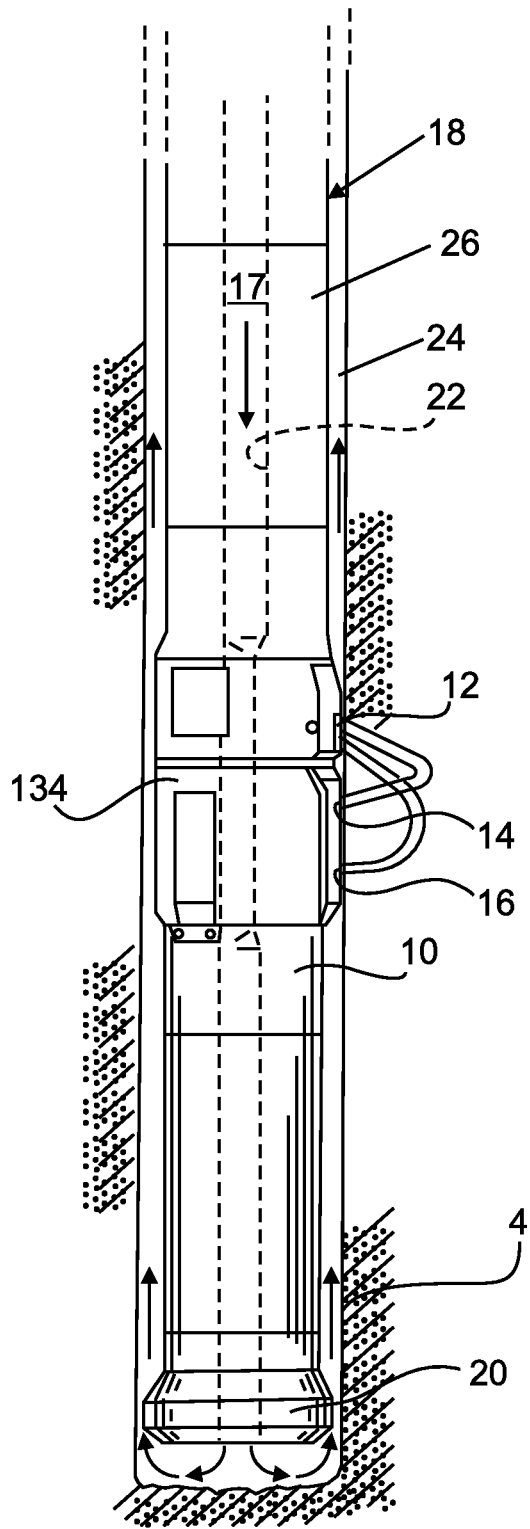
FIGS. 2 and 3 depict aspects of exemplary embodiments of prior art logging instruments.

Referring now to FIG. 2, a diagram of basic components of a prior art gamma-ray density tool 10 is shown. In this example, the tool 10 is included with a drill string 26. The drill string 26 includes a drill bit 20. In order to limit hydrostatic over pressurization, lubricate components, cool components and the like, drilling mud 17 is pumped to the drill bit through an inner annulus 22. The drilling mud 17 emerges from the drill bit 20, and returns to the surface via a return 24 that lies between the drill string 26 and the formations 4.

In this example, the tool 10 includes a drill collar 18 which contains a gamma-ray source, commonly referred to as a "chemical source" 12 and two spaced gamma-ray detector assemblies 14 and 16. All three components are placed along a single axis that has been located parallel to the axis of the tool 10. The detector 14 closest to the gamma-ray source may be referred to as a "short spaced detector" 14 (also referred to as a "near detector") and the detector farthest away (16) is referred to as a "long spaced detector" (also referred to as a "far detector"). As will be discussed hereinafter, gamma-ray shielding is located between detector assemblies 14, 16 and source 12. Windows open up to the formation from both the detector assemblies and the source. A layer of drilling fluid (mud) is present between the formation and the detector assemblies and source as the standoff layer 5.

The tool 10 is placed into service by loading it with the sealed chemical source 12 (typically cesium 137) and lowering it into the formation 4. Gamma-rays are continuously emitted by the source 12 and these propagate out into the formation 4.

Two physical processes dominate the scattering and absorption of gamma rays at the energies used in density tools. They are Compton scattering and photoelectric absorption. A macroscopic cross section for Compton scattering, $\sigma_{cs}$, (i.e., probability of scattering while passing through a set thickness of material) is proportional to the electron density in the formation and is weakly dependent on the energy of the incident gamma ray (on a graph, this falls fairly slowly with increasing energy). Since the electron density is, for most formations, approximately proportional to the bulk density, the Compton cross section, $\sigma_{cs}$, is proportional to the density of the formation. The macroscopic photoelectric absorption cross section, $\sigma_{pe}$, is also proportional to the electron density. Unlike the Compton cross section, $\sigma_{cs}$, photoelectric absorption cross section, $\sigma_{pe}$, is strongly dependent on the energy of the incident gamma rays and on the materials in the formation (the lithology).

Formation density is determined by measuring the attenuation of gamma rays through the formation. In this prior art tool, shielding is included in the tool to reduce a flux of gamma rays traveling straight through the tool. This flux can be viewed as background noise for the formation signal. The windows (in a detector hatch cover and fluid displacement sleeve 134) let gamma rays go into the formation and from the formation to the detectors. The layer of mud between the tool and the formation may be reduced by the use of an "in gauge" sleeve 134. After the standoff 5 (i.e., the mud layer) is minimized, density measurements made by using the two detectors 14, 16 are combined to form a compensated measurement.

As mentioned, compensation for the mud and/or standoff is usually accomplished through the use of the short spaced detector 14 and the long spaced detector 16. Since gamma rays travel through more of the formation 4 to reach the long spaced detector 16 than they do to reach the short spaced detector 14, the long spaced detector 16 shows a significantly larger count rate change for a given change in formation density. This allows for the compensation by using the two detector responses and a "rib" algorithm. The rib function, provides for the calculation of compensation (which should be equal to the difference between the true and the measured long spaced density), as a function of the difference between the short and long spaced densities. These aspects and other aspects are known in the prior art, and generally not discussed in greater depth herein. However, one reference that includes these aspects is U.S. Pat. No. 5,397,893, entitled "Method for analyzing formation data from a formation evaluation measurement-while-drilling logging tool." This patent issued on May 14, 1995 and is assigned to Baker Hughes Incorporated. Accordingly, such relevant aspects disclosed therein are incorporated herein by reference. Having thus provided some context, an introduction to the invention is provided.

Disclosed herein are methods and apparatus for performing gamma density measurements using a neutron based instrument. The neutron based instrument does not include a chemical source, and therefore provides users with equipment that offers improved radiological safety as well as reduced cost. The teachings provided herein are particularly beneficial for making use of pulsed neutron generator based instruments deployed for other purposes, such as lithology and porosity measurements.

Embodiments of downhole tools using a pulsed neutron generator usually provide a burst of about $10^4$-$10^5$ fast neutrons. When the neutron flux is averaged over time, this is equivalent to a steady state emission of about $10^8$-$10^9$ neutrons/second. For these embodiments, an energy spectrum of the neutrons shows that the neutrons are very close to monoenergetic, and exhibit an initial energy of about 14 MeV, while an angular distribution of the neutrons is very close to isotropic. Therefore, neutrons provided by a pulsed neutron generator generally radiate in all directions, and penetrate not only into the formation direction but also into the tool itself. Accordingly, most tools making use of neutron sources include significant shielding for protection of other components.

Figure 3:
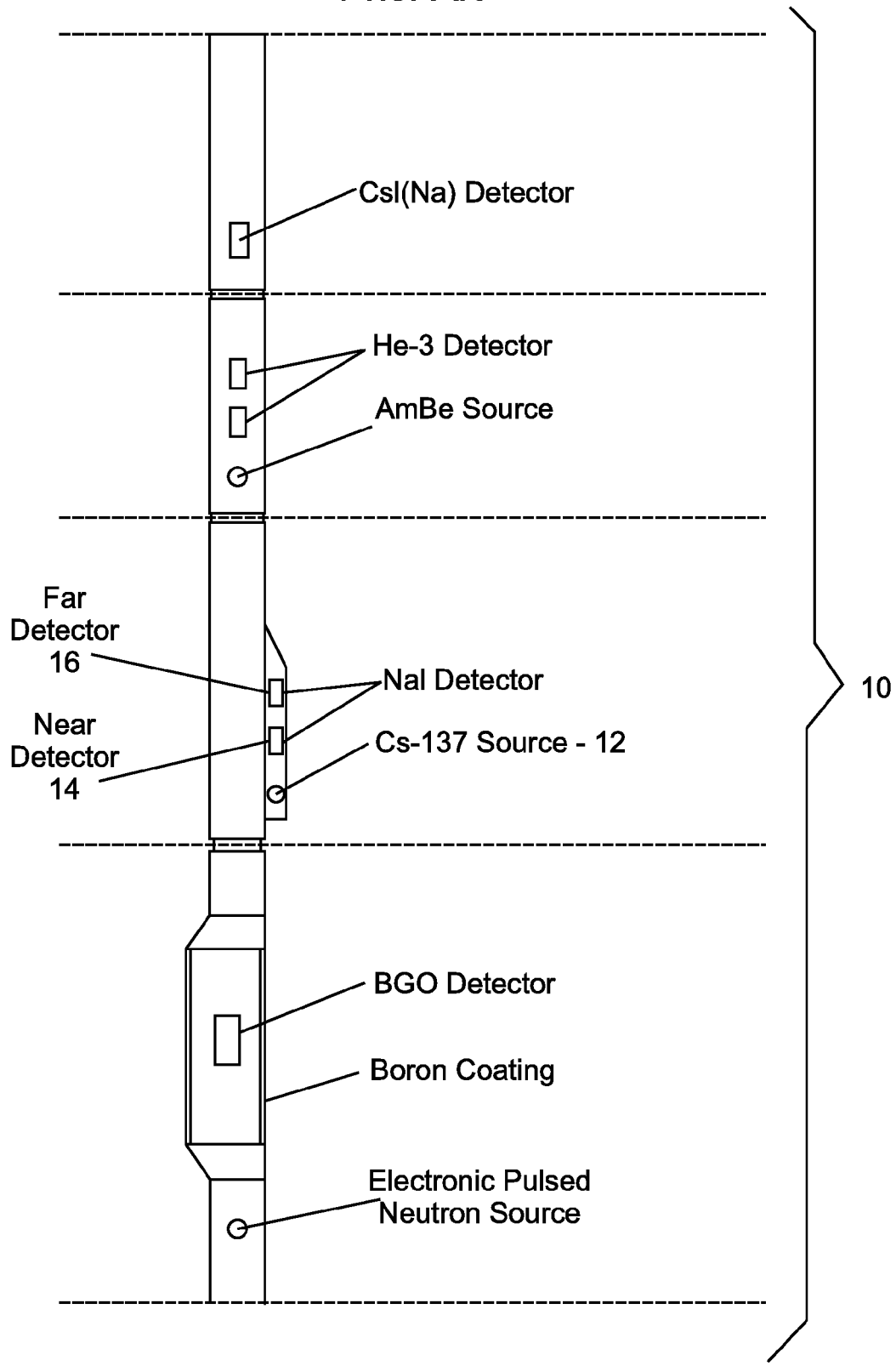

Referring now to FIG. 3, there is shown another embodiment of a prior art logging instrument 10 that uses pulsed neutron emissions. In this example, the instrument makes use of a BGO scintillation detector, high speed downhole electronics, and an accelerator-based neutron source capable of pulsing at high frequencies. This instrumentation is packaged inside a high-strength titanium housing. Neutron and gamma ray shielding materials may be strategically placed inside the instrument to prevent the detection of gamma rays from unfavorable directions, and to protect operators from radiation exposure. In some embodiments, a recessed, abrasion-resistant boron-carbide ($B_4C$) shielding is placed on the housing over the detector section, to stop thermal neutrons.

In one embodiment, while operating in the sub-surface borehole environment, the electronically timed pulsed-neutron source emits neutrons having energy of about 14 MeV. The neutrons are emitted into the ambient formation(s) 4 and the subsurface materials. In about 1-2 μsecs, these fast neutrons promptly interact with the nuclei of the surrounding sub-surface materials and scatter elastically as well as inelastically, ultimately losing their energy. Some of the nuclei of the atoms with which the neutrons interact become energetically excited during the inelastic scattering process, after which they return to the ground state by emitting one or more gamma rays with energies characteristic of the parent isotope. This process results in the measured inelastic spectrum of gamma ray energies, and can only take place if the energy of the incident neutron is sufficient to raise the nucleus of the parent isotope to one or more of its excited energy levels, or bound states.

The neutrons continue their slowing down process until they reach thermal equilibrium with the surrounding medium. Thermal neutrons typically possess energy of about 0.025 eV, and may remain in a diffusion process for up to about 800 μsec, or slightly more, before being absorbed by the nuclei of the surrounding atoms. This absorption results in new isotopes of the same elements. Upon absorption, the nuclei of these isotopes usually de-excite through emission of one or more gamma rays. As in the case of the inelastic spectrum, these energies carry the fingerprint of the parent isotope and allow each element (i.e., isotope) to be uniquely identified. This absorption process leads to the acquisition of the capture spectrum. The capture spectra and the inelastic spectra for each individual isotope are different.

Due to their initial energy levels, photons from Cs-137 are not very penetrating, at least in comparison to most photons generated through neutron and matter interactions. Table I provides the mean free paths for 662 keV photons (Cs-137 characteristic photon energy) in various formation materials and some relevant fluids. As may be seen, there is a significant difference between the mean free paths for formation material and fluid. That basically indicates that if there is an uninterrupted fluid connection between source and detector, the density values would become inaccurate. This is one reason why density values reliant on data from the far detector should be corrected with the short spaced detector values.

Consider now aspects of the short spaced detector 14, the long spaced detector 16, and gamma emissions from the tool 10 and from the formation 4. First, due at least in part to the larger size and distant placing of the long spaced detector 16, the long spaced detector 16 favors photons coming from deeper parts of formation 4. When there is a standoff 5, it may be seen that the flux profile outside the tool goes up to the levels of other profiles. Gamma rays travel comparatively easily through the water conduits along the tool body and this affects the measurements. The water between the tool 10 and the formation 4 acts like a conduit for photons. That is, according to data for the mean free path provided in Table I, 662 keV photons should go through at least five interactions in the formation 4 before they can reach the short spaced detector 14. This is a number dictated by the mean free path of the photons at 662 keV. For the long spaced detector 16, the same number is about 8 interactions. It should be noted that these numbers are lower limits (that is, such values are possible only if all scattering angles are 0 degrees), so the actual numbers would be larger. Compton scattering with nonzero scattering angles would further reduce the energy of the photons, and mean free paths get shorter with lower energy levels. Therefore, with loss of energy, the actual interaction numbers go up to higher values. As a result of those high numbers of interactions taking place in the formation, a very small portion of the photons can reach the detectors. This is one of the reasons why there is a need for a very bright Cs-137 source for gamma density logging. This is also what makes the Cs-137 source (typically around 2 Curie) a very potent health hazard for the field engineers.

TABLE I

Mean Free Paths of 662 keV Cs-137 Photons in Various Materials

| Material | Mean Free Path for 667 keV Photons (cm) |
|---|---|
| 0.8 g/cc oil (14% H + 86% C) | 14.3 |
| 1.0 g/cc Fresh Water | 11.7 |
| 1.738 g/cc Pure Magnesium | 7.6 |
| 2.71 g/cc Limestone | 6.2 |
| 2.699 g/cc Pure Aluminum | 5.0 |
| 2.65 g/cc Sandstone | 4.9 |
| 2.87 g/cc Dolomite | 4.5 |

TABLE II

Mean Free Paths of 6.130 MeV Oxygen-16 Inelastic Photons in Various Materials

| Material | Mean Free Path for 6.13 MeV Photons (cm) |
|---|---|
| 0.8 g/cc oil (14% H + 86% C) | 46.0 |
| 1.0 g/cc Fresh Water | 36.5 |
| 1.738 g/cc Pure Magnesium | 21.6 |
| 2.71 g/cc Limestone | 13.6 |
| 2.699 g/cc Pure Aluminum | 14.0 |
| 2.65 g/cc Sandstone | 14.3 |
| 2.87 g/cc Dolomite | 13.2 |

TABLE III

Mean Free Paths of 4.439 MeV Carbon Inelastic Photons in Various Materials

| Material | Mean Free Path for 6.13 MeV Photons (cm) |
|---|---|
| 0.8 g/cc oil (14% H + 86% C) | 37.4 |
| 1.0 g/cc Fresh Water | 30.1 |
| 1.738 g/cc Pure Magnesium | 18.6 |
| 2.71 g/cc Limestone | 11.8 |
| 2.699 g/cc Pure Aluminum | 12.2 |
| 2.65 g/cc Sandstone | 12.2 |
| 2.87 g/cc Dolomite | 11.3 |

Further aspects of the physics underlying the invention are now discussed. As is widely known, pulsed neutron generators emit neutrons with about 14 MeV energy levels. This energy is high enough to induce a large variety of nuclear interactions. What we are basically interested in this application are inelastic and capture interactions. The oxygen and carbon usually emit inelastic photons at the 6.13 and 4.439 MeV levels. These high energy photons provide a good way of reading density values from deeper into the formation 4 than previously achievable with the conventional density logging. Table II gives the mean free paths oxygen inelastic photons inside various formations. Important entries in that table are Limestone, Dolomite and Sandstone values. As it is seen, typical mean free path is around 14-15 cm. This points out that any photon originating in the tool can penetrate into the formation around that distance before it goes through an interaction. The same values for carbon inelastic photons are around 11-12 cm. Both of those provide a good interrogation depth if such a technique is proven to be feasible. As may be seen in Table I, the same distance is around 4-5 cm for Cs-137 photons. When those two sets of mean free paths are compared, it can be seen that using inelastic photons can have significant advantage over Cs-137 photons due to the depth of investigation. Accordingly, the present invention provides gamma photons of sufficient energy such that quality of data is improved. That is, one weak point of currently employed techniques for density logging is the shallow depth of investigation that arises for cased wells or if a sampling volume equates to an invaded zone (a zone invaded with drilling mud).

Figure 8:
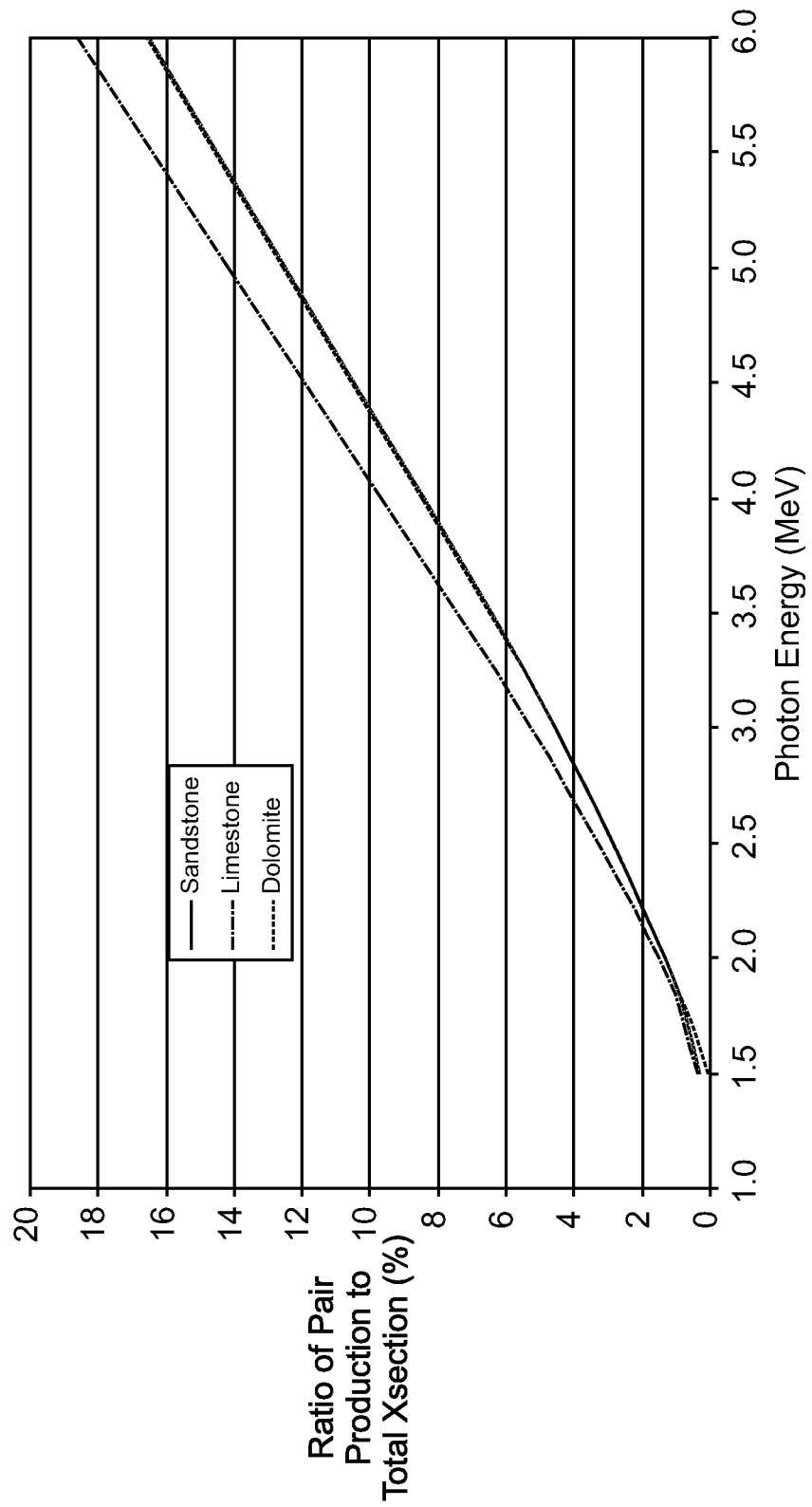
FIG. 8 is a graphic depicting a ratio of pair production cross sections to total cross sections for three formation types.

Further consideration is given to pair production interactions. Every time a photon undergoes a pair production event, 1.02 MeV of the incident energy gives rise to an electron/positron pair with the pair sharing the remaining energy as kinetic energy. The pair production is usually a smaller portion of the interactions taking place inside the formation. This can be seen in FIG. 8, which depicts a ratio of a pair production cross section, $\sigma_{pp}$, to the total cross section, $\sigma_{total}$, as a function of the photon energy. At those higher energy levels, total cross section, $\sigma_{total}$, is predominantly the Compton cross section, $\sigma_{cs}$. Therefore, this ratio can be interpreted as ratio of pair production to the sum of Compton scattering and pair production cross sections. Although there is some increase with the energy, the change between sandstone, limestone and dolomite is close enough to be handled with an averaging scheme, as needed. Further, annihilation photons originating from inelastic photon pair production interactions may be eliminated from energy spectra as needed by setting a detection threshold higher than 0.511 MeV (which will also reduce pair production effects from the measurements).

Figure 9:
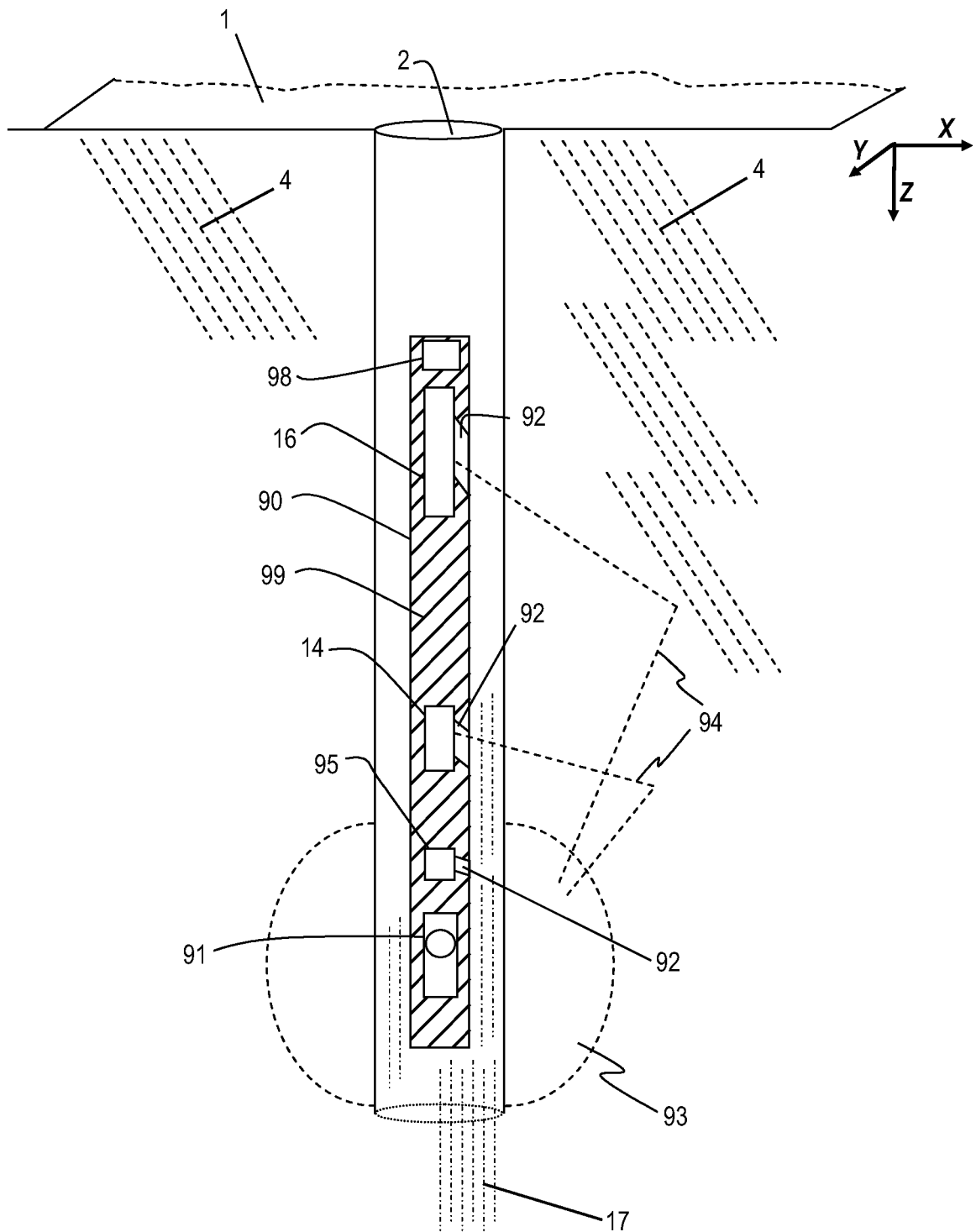
FIG. 9 depicts aspects of a logging instrument according to the teachings herein.

Consider now FIG. 9, where there is shown an embodiment of a neutron density measurement instrument 90 according to the teachings herein. In this non-limiting embodiment, the instrument 90 includes a far detector 16, a near detector 14 and a source monitoring detector 95. Each detector 14, 16, 95 includes a collimator 92. Each collimator 92 is generally adapted to the respective detector 14, 16, 95 and designed to receive scattered gamma rays 94 impingent upon the instrument 90. Each of the detectors 14, 16, 95 is surrounded by shielding 99 to limit noise from ambient or background radiation. Included in the instrument 90 is a neutron source 91. In this example, the neutron source 91 is a pulsed neutron source. Generally, the neutrons produced interact in surrounding sub-surface materials and can be considered to create a cloud of gamma rays 93. Of course, one skilled in the art will recognize this may be likened to a "probability cloud", which represents a population of at least one of induced photons, an increased presence of induced photons, or a population of induced photons that exceed a certain energy.

Each of the detectors 14, 16, 95, as well as the neutron source 91 may be coupled to an electronics unit 98. The electronics unit 98 may be on-board the instrument 90, topside, or elsewhere downhole (such as incorporated into a remote part of the drillstring). Generally, the electronics unit 98 includes a power supply for each component and provides for data collection, analysis, and general processing as needed. The electronics unit 98 may include machine executable instructions stored on machine readable media, with the instructions being provided for execution of various control, analysis and other such tasks.

In this example, the source monitoring detector 95 is predominantly used to monitor initial inelastic gamma rays induced by the neutron source 91. The near detector 14 and the far detector 16 are both predominantly used to derive the density ($\rho$) of the formations 4 by detecting backscattered inelastic gamma rays 94.

In one embodiment, the pulsed neutron source emits neutron pulses at a frequency approximately 10 kHz, the duty ratio of neutron pulses is from 10% to 40%. The average yield of the neutron generator can be in the order of $10^8$ n/s.

Figure 4:
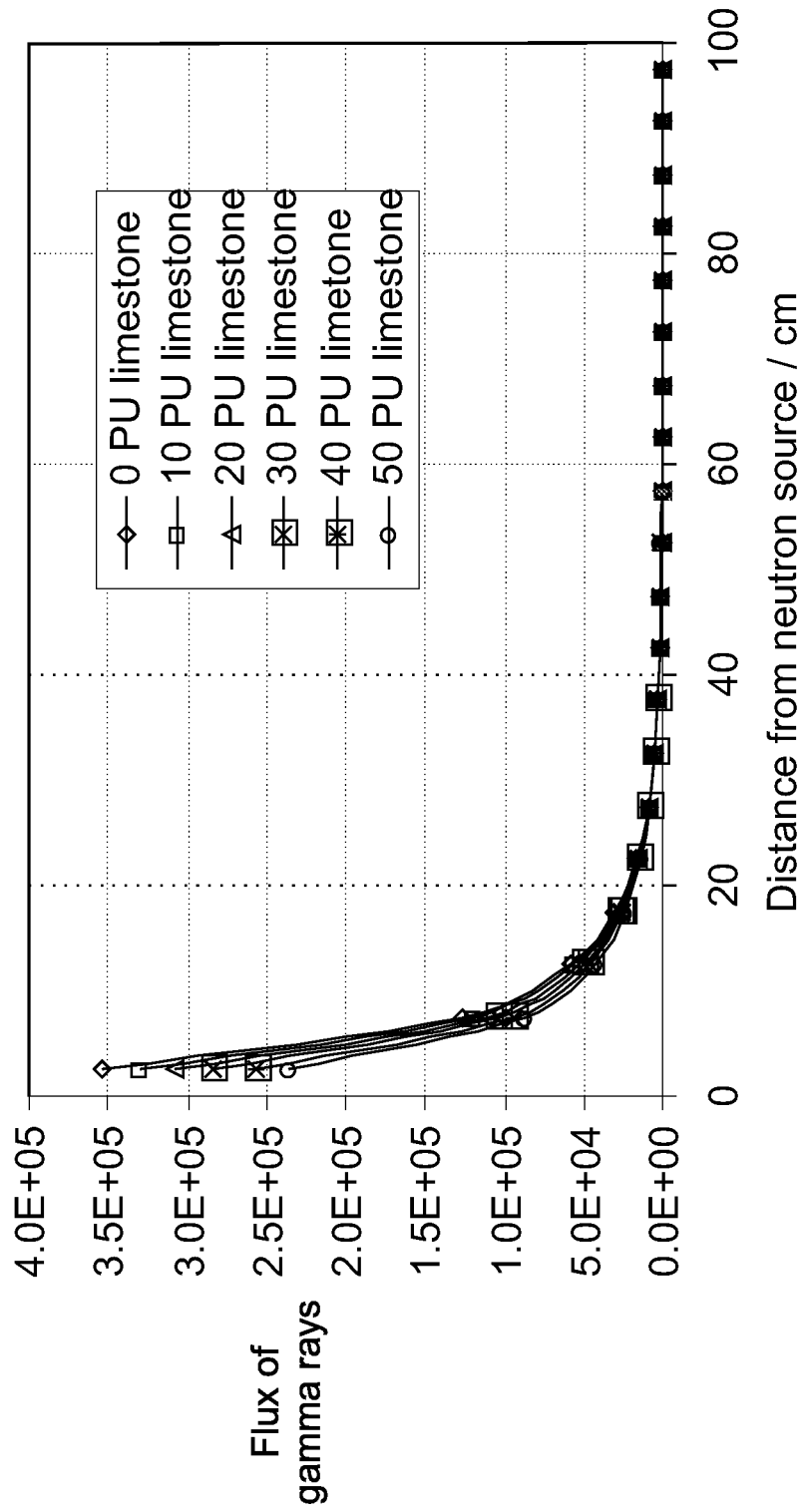
FIG. 4 is a graph depicting the spatial distribution of inelastic gamma rays initiated by a 14 MeV pulsed neutron source in limestone at different porosities.

Since the neutron inelastic scattering only happens for high energy neutrons, gamma rays from the interactions are produced in an area which is relatively close to the neutron source 91. The spatial distribution of inelastic gamma rays initiated by the pulsed neutron source is shown in FIG. 4 for the limestone at different porosities. It is shown that most of the inelastic gamma rays are in the range of 20 cm from the neutron source, regardless of formation porosity. That is to say, if the detectors 14, 16, 95, only detect gamma rays from neutron inelastic scattering, the size of the cloud of inelastic gamma rays 93 is in fact much smaller compared to detection all the gamma rays. In that regard, the collimators 92 placed in front of each of the detectors 14, 16, 95, may essentially be designed to facilitate detection of gamma rays from a specific region of the sub-surface materials.

Figure 5:
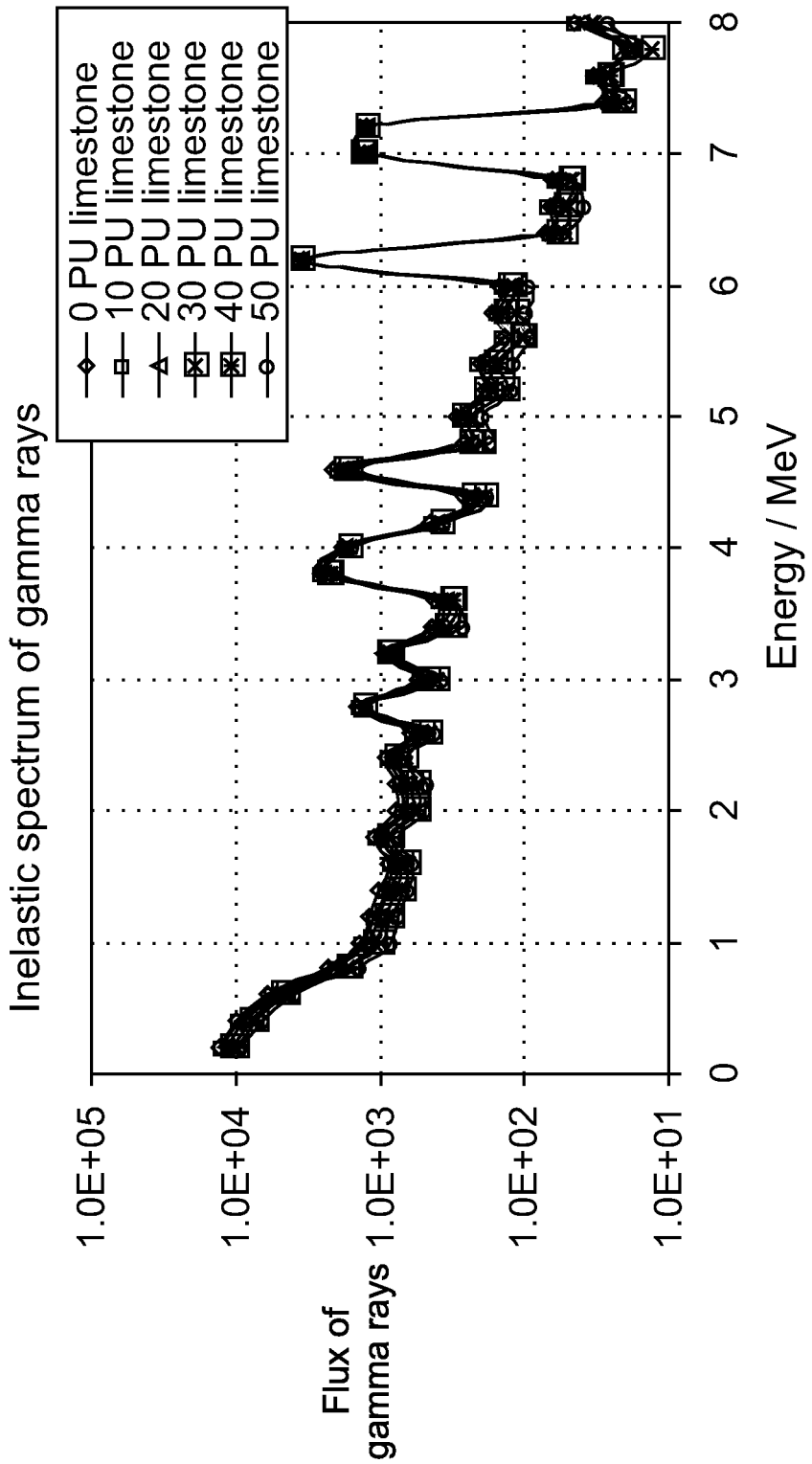
FIG. 5 is a graph depicting the inelastic spectrum of gamma rays at a certain distance from the neutron source in limestone at different porosities (logarithmic scale)

In order to detect only inelastic gamma rays, the gamma rays from each detector 14, 16, 95, are collected according to their production mechanism: neutron inelastic scattering or neutron capture reaction. In some embodiments, that is achieved by relating the signal from each detector to a gate signal from the generator in a coincident or anti-coincident mode. The gate signal is an output from the pulsed neutron generator, which is coincident to the neutron pulses. In this way, during the neutron pulses (coincident mode), most output signals are due to the gamma rays which arise from neutron inelastic scattering. Between the neutron pulses (anti-coincident mode), most of the output signals arise from neutron capture interactions. Thus, there may be two spectra from each of three detectors: a first spectrum representing the inelastic scattering interactions and a second spectrum representing the capture interactions. The spectra may be stored in memory for at least one of ongoing, further and subsequent processing. The obtained capture spectrum can be used to further strip the contribution from thermal neutrons capture interactions on the inelastic spectrum for each respective detector. FIG. 5 shows the modeled inelastic spectrum for the limestone in different porosities.

Figure 6:
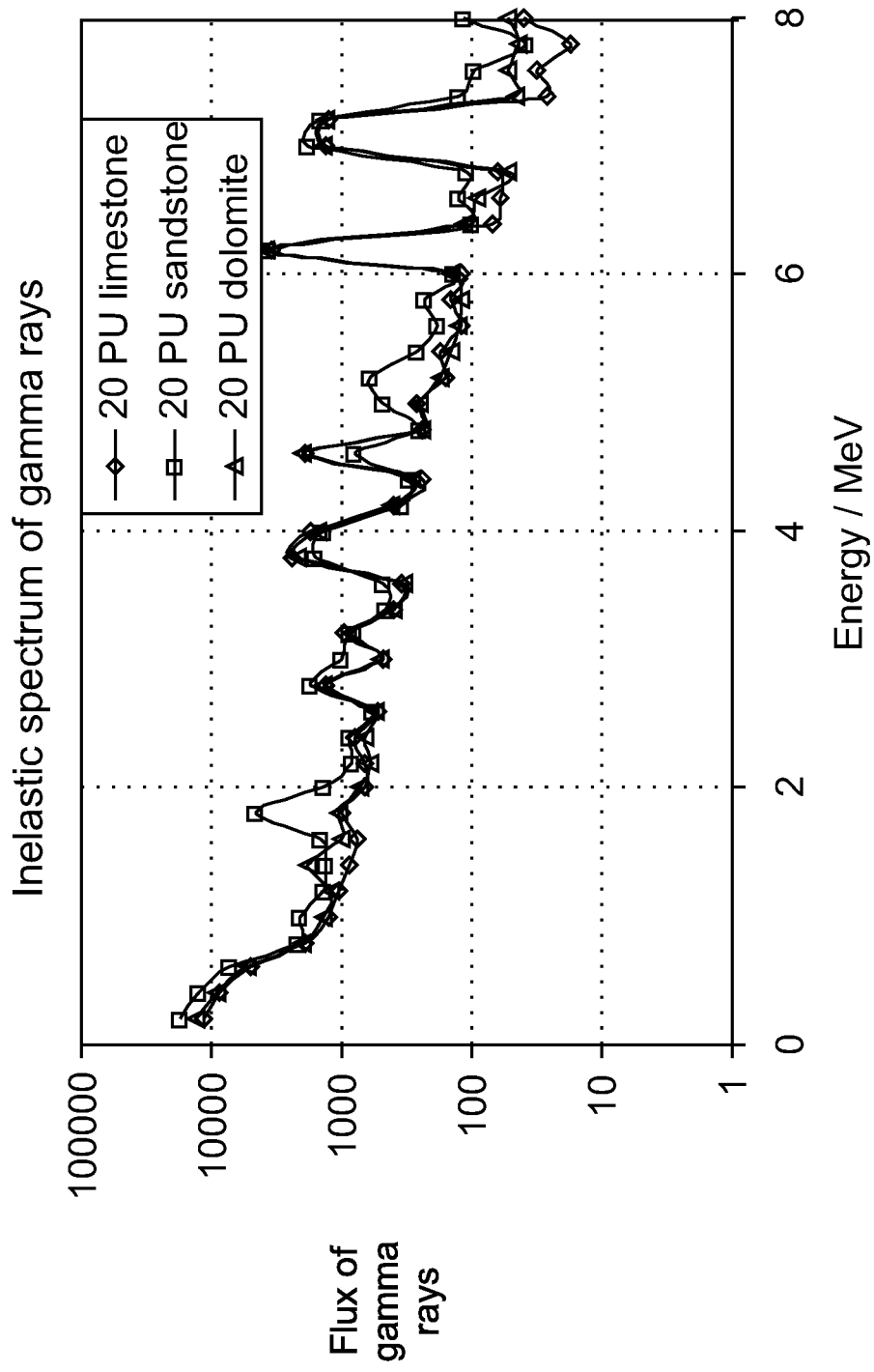
FIG. 6 is a graphic providing the inelastic spectrum of gamma rays in three formation types in the same porosity and same distance from the neutron source (logarithmic scale)

Since the production of the gamma rays from neutron inelastic scatting is dependent on the yield of the neutron source 91 and the nearby environment (the borehole 2 and the formation 4), the source strength of the gamma rays 93 may vary. Thus, it is difficult to derive density ($\rho$) of the formation 4 directly from the counting rates of one or two detectors without compensating for production of the gamma rays. Further, attenuation of the gamma rays 93 in the formation 4 must be accounted for, and is dependent upon, among other things, the initial energy of the gamma rays 93. The modeled initial inelastic spectrum for 20PU limestone, sandstone and dolomite is shown in FIG. 6. Though the shape of spectrum for the three formation types at the same porosity is similar to each other, difference is clearly shown. Therefore, in order to accurately derive the density ($\rho$) of the formation 4 from the detected inelastic gamma rays, the effect of the source strength and characteristics of the initial spectrum of the inelastic gamma rays has to be considered and included in the density calculation.

Figure 7:
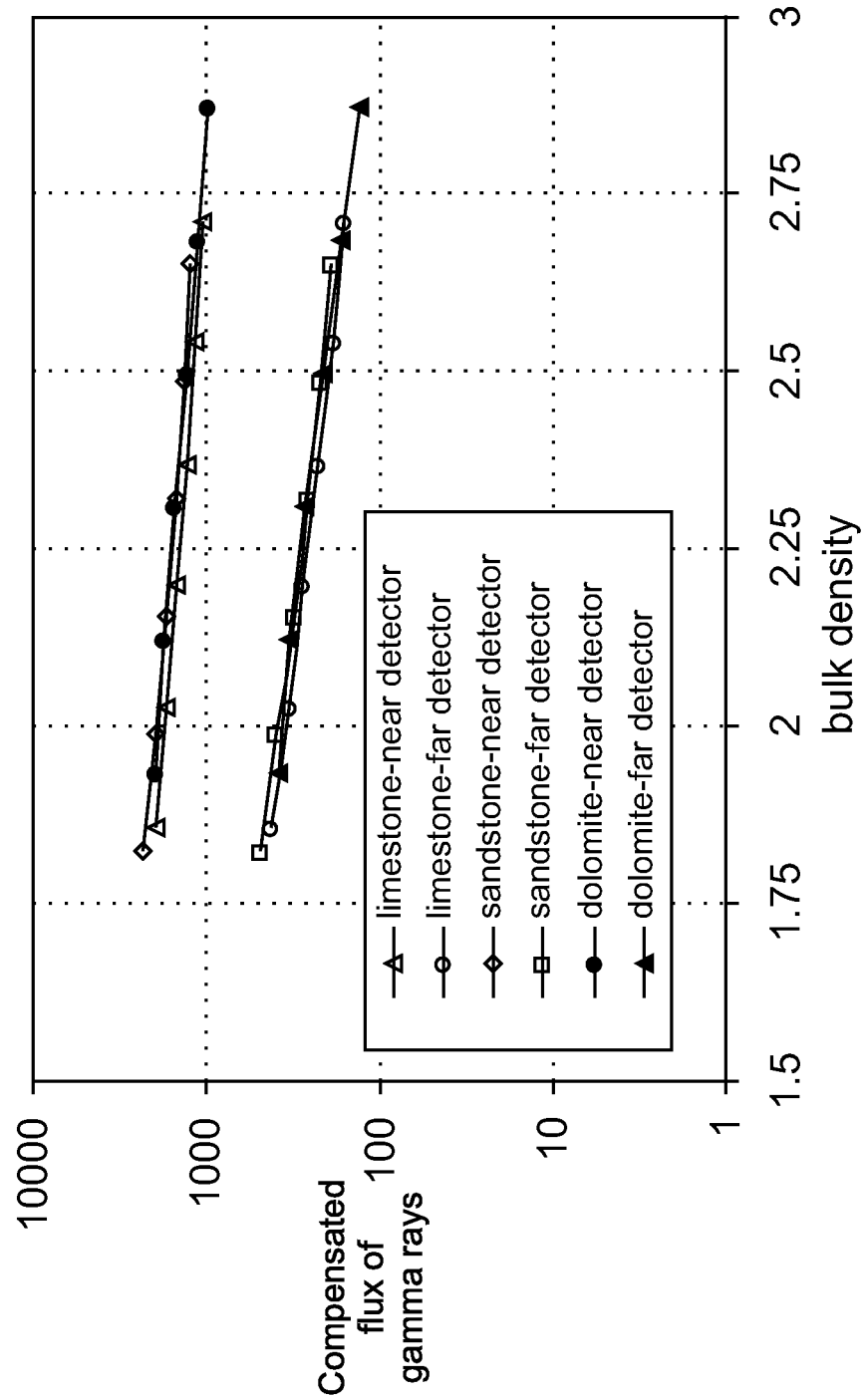
FIG. 7 is a graphic providing the relationship between the source-compensated flux of back scatted inelastic gamma rays at the near/far detector and the bulk density for three formation types (logarithmic scale)

In order to compensate the effect from the production of inelastic gamma rays, the source monitoring detector 95 is used to directly measure the strength and energy spectrum of the initial inelastic gamma rays induced by the neutron source 91. The data regarding the initial spectrum is then used to compensate count rates of the near detector 14 and the far detector 16. For example, the energy spectrum from source monitoring detector 95 may be processed for the count rates of gamma rays using a number of energy bins, with similar processing for the near detector 14 and the far detector 16. The energy bins for backscattered inelastic spectra from the near detector 14 and the far detector 16 are then related to the energy bins for the initial inelastic spectrum from the source monitoring detector 95. The compensated flux of backscattered inelastic gamma rays at the near and far detector versus bulk density is shown in FIG. 7. It is shown that after compensated the initial inelastic gamma rays, the linear relationship lies between the logarithm of the count rate and the bulk density for both near and far detectors. The relationship is independent to the formation types, which shows the feasibility of the proposed method for the formation density measurement. The density can then be obtained by using the source compensated count rates for each of near detector 14 and the far detector 16. Two examples of algorithms for calculation of the density are provided. The exemplary algorithms are provided in FIGS. 10 and 11.

As discussed herein, arranging data into "bins" or "binning" data generally relates to grouping and classifying the data according to some characteristic. For example, as discussed above, energy bins may be used, where detection events are classified according to energy groups (e.g., in a histogram).

Figure 10:
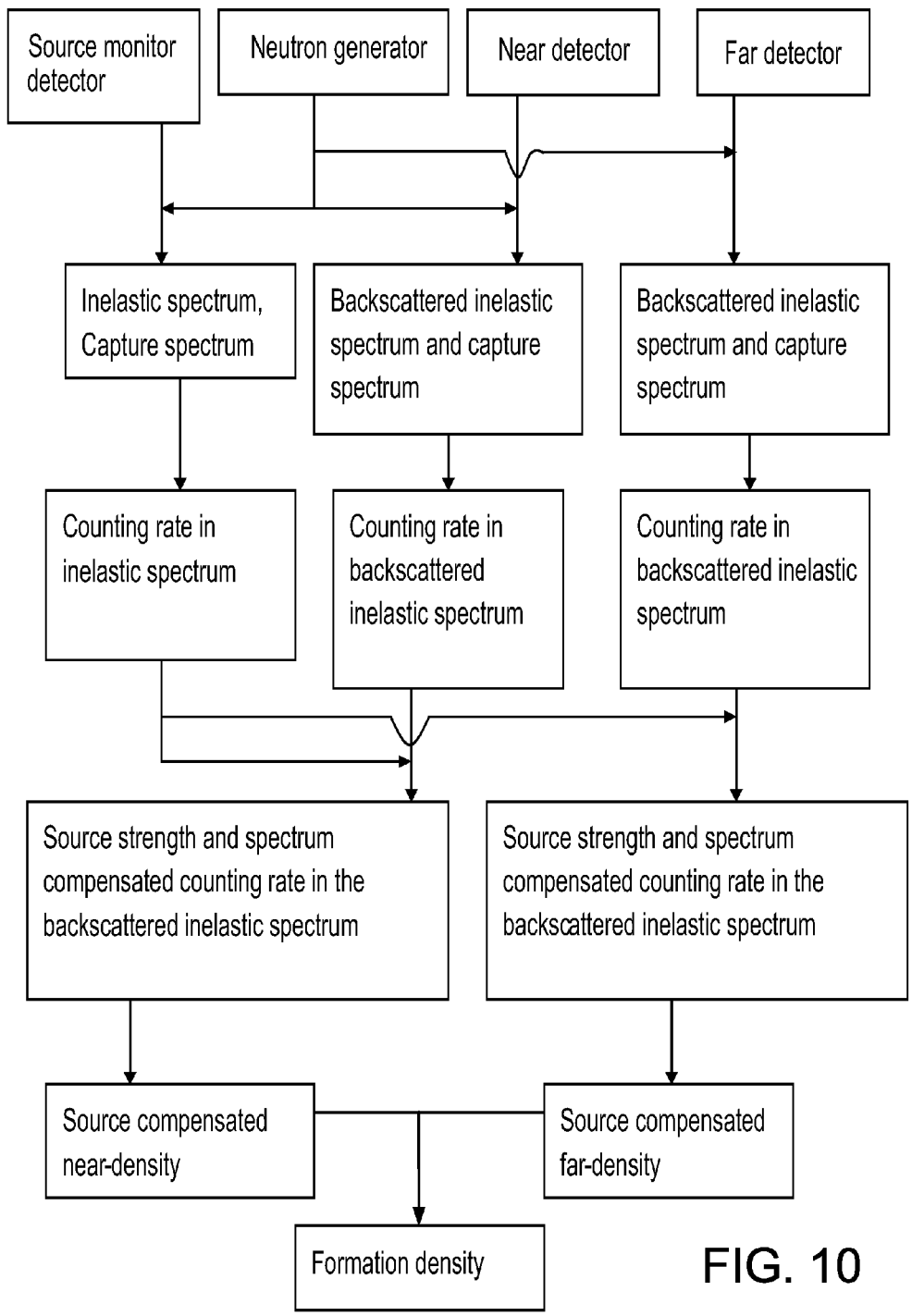
FIGS. 10 and 11 are flow charts presenting exemplary algorithms for deriving a density ($\rho$) of sub-surface materials surrounding the instrument.

In FIG. 10, the count rates of backscattered inelastic gamma rays from both the near detector 14 and the far detector 16 are weighted by the initial inelastic gamma rays for two source compensated counting rates, for the near detector 14 and the far detector 16, respectively. The two source-compensated near and far count rates may then be used to obtain the source compensated density for the near detector (also referred to as a "near-density") and the source compensated density for the far detector (also referred to as a "far-density"). The source compensated near-density and far-density are then used to derive the formation density.

Figure 11:
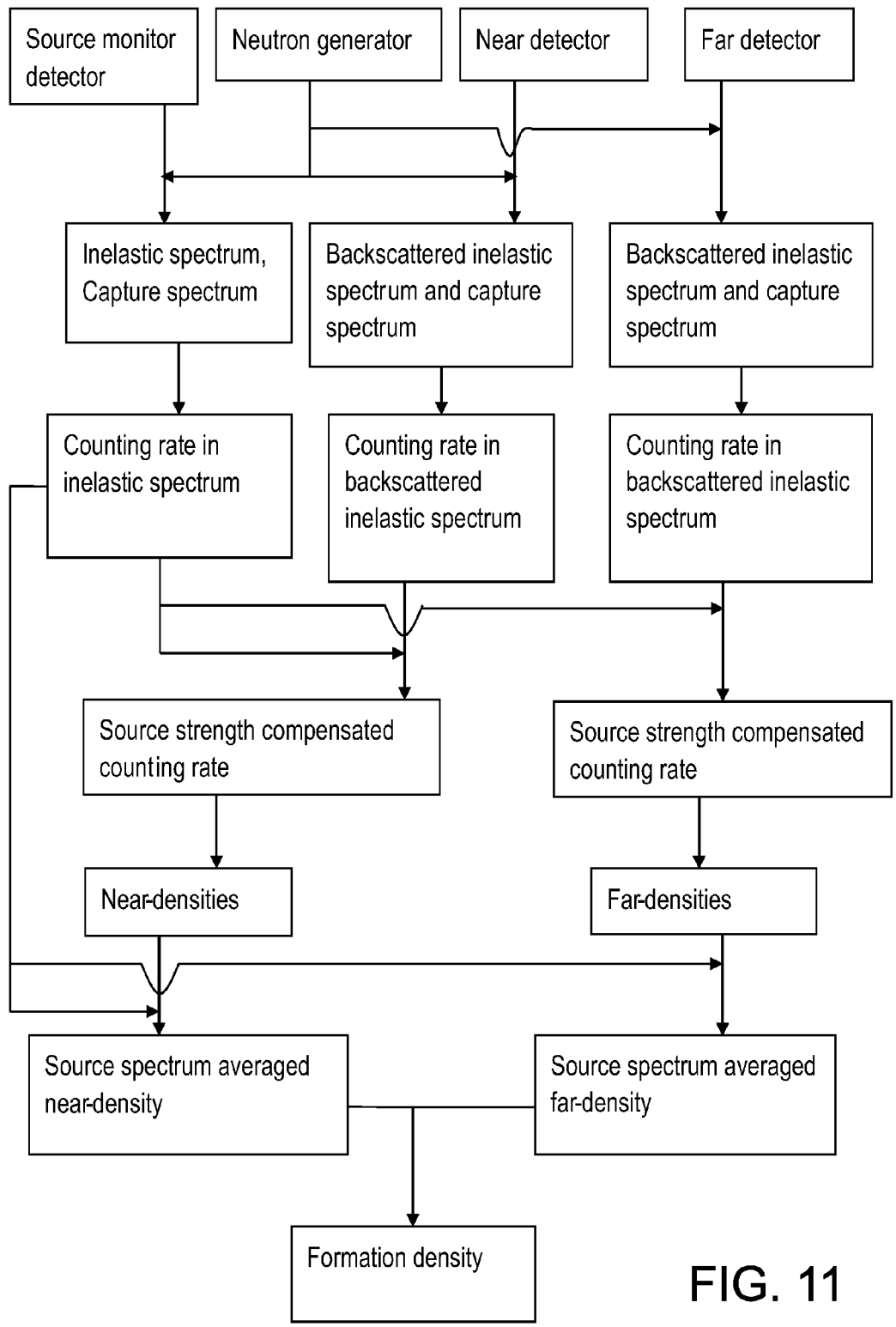

In FIG. 11, a second exemplary and non-limiting algorithm is provided. In this example, a number of source compensated counting rates of gamma rays may be obtained by establishing ratios of the counting rates from one of the near detector 14 and the far detector 16 to a factor of the counting rate in the related energy bins in the spectrum from the source monitoring detector 95. The source-compensated near counting rates or far counting rates are then used to obtain a number of near-densities or far-densities. The near-densities and the far-densities may then be averaged by the weight of related energy bins in the energy spectrum from the source monitoring detector 95 for the averaged near-density and the averaged far-density. The formation density is obtained from the averaged near-density and the averaged far-density to compensate for borehole effects.

Accordingly, one skilled in the art will recognize that the teachings herein provide a novel neutron-based density measurement tool that operates without a chemical source. In general, the teachings provide for use of a detector (the source monitoring detector 95) to monitor the production of neutron initiated gamma rays from inelastic scattering. The teachings then provide for compensation of counting rates in the traditional near detector and far detector to obtain density of surrounding formations and sub-surface materials.

In support of the teachings herein, various analysis components may be used, including a digital system and/or an analog system. Exemplary components include power supplies, multiple channel analyzers (MCA), single channel analyzers (SCA) and the like. Signal analysis may be performed using high speed electronics capable of providing real-time, or near-real-time signal processing.

Further, the system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A downhole instrument for estimating density of sub-surface materials, the instrument comprising:
    a neutron source;
    an initial inelastic gamma ray detector configured to measure initial inelastic gamma rays generated by a reaction of neutrons output from the neutron source with a surrounding sub-surface material;
    a near detector for detecting backscattered inelastic gamma rays, the near detector located farther from the neutron source than the initial inelastic gamma ray detector;
    a far detector for detecting backscattered inelastic gamma rays, the far detector located farther from the neutron source than the near detector; and
    an electronics unit coupled to each of the source monitoring detector, the near detector and the far detector, the electronics unit configured for receiving a first detection signal corresponding to the initial inelastic gamma rays detected by the initial inelastic gamma ray detector, a second detection signal corresponding to backscattered inelastic gamma rays detected by the near detector and a third detection signal corresponding to backscattered inelastic gamma rays detected by the far detector, and compensating at least one of the second detection signal and third detection signal based on the first detection signal.

2. The instrument as in claim 1, wherein the electronics unit is coupled to the neutron source for monitoring a timing signal of the neutron source controlling an on and off state of the neutron source for generating neutrons.

3. The instrument as in claim 1, wherein the electronics unit is equipped to identify gamma rays in at least one of the initial inelastic gamma ray detector, the near detector and the far detector in at least one of a coincident mode and an anti-coincident mode.

4. The instrument as in claim 1, wherein the neutron source comprises a pulsed neutron generator.

5. The instrument as in claim 1, wherein the electronics unit is further configured to estimate a density of the sub-surface materials according to at least one of a compensated second detection signal and a compensated third detection signal, having been compensated based on the first detection signal.

6. The instrument as in claim 1, wherein the electronics unit compensates at least one of the second detection signal and the third detection signal based on initial inelastic gamma rays detected by the initial inelastic gamma ray detector.

7. The instrument as in claim 6, wherein the electronics unit compensates the at least one of the second detection signal and the third detection signal based on at least one of a source strength of the neutron source and an energy spectrum of the initial inelastic gamma rays.

8. The instrument as in claim 1, wherein the electronics unit is further configured for identifying a coincident mode of the neutron source, corresponding to a time that the neutron source is transmitting neutrons, identifying an anti-coincident mode of the neutron source corresponding to a time that the neutron source is not transmitting neutrons, collecting data across each of the coincident mode and the anti-coincident mode, and categorizing the collected data according to the identification of the coincident mode and anti-coincident mode, and
    wherein the coincident mode identifies inelastic gamma rays and the anti-coincident mode identifies neutron capture gamma rays.

9. The instrument as in claim 1, wherein the electronics unit is further adapted for binning detection events within each of the detection signals.

10. The instrument as in claim 1, wherein the initial inelastic gamma ray detector comprises at least one of a collimator and surrounding shielding.

11. A method for estimating a density of sub-surface materials, the method comprising:
    irradiating the sub-surface materials with a neutron source;

detecting, by an initial inelastic gamma ray detector, initial inelastic gamma rays generated by a reaction of neutrons output from the neutron source with a surrounding sub-surface material;

detecting backscattered inelastic gamma rays from the sub-surface materials with at least one of a near detector and a far detector located farther from the neutron source than the initial inelastic gamma ray detector;

compensating a signal representing the backscattered gamma rays based on a signal generated by detecting the initial inelastic gamma rays; and estimating the density of the sub-surface materials according to the compensated signal.

12. The method as in claim 11, wherein detecting the backscattered gamma rays comprises collecting a detection signal for at least one of the near detector and the far detector.

13. The method as in claim 11, wherein compensating the signal representing the backscattered gamma rays comprises at least one of adjusting a detection signal for a near detector and a detection signal for a far detector according to a detection signal from a detector proximate to the neutron source.

14. The method as in claim 11, further comprising placing the neutron source proximate to the sub-surface materials by using one of a drilling apparatus and a wireline apparatus.

15. The method as in claim 11, wherein estimating the density of the sub-surface materials comprises estimating the density using compensated data from at least one of a near detector, a far detector and a combination of the near detector and the far detector.

* * * * *